United States Patent [19]

Koerte

[11] Patent Number: 5,401,834
[45] Date of Patent: Mar. 28, 1995

[54] ASYMMETRICAL 1:2 CHROMIUM AND COBALT COMPLEXES OF FURTHER SUBSTITUTED 6- OR 7-AMINO-1-HYDROXY-2-(NITRO-PHENYLAZO)-3-SULFONAPTHALENES

[75] Inventor: Klaus Koerte, Ettingen, Switzerland

[73] Assignee: Sandoz Ltd., Basel, Switzerland

[21] Appl. No.: 81,927

[22] Filed: Jun. 22, 1993

[30] Foreign Application Priority Data

Jun. 24, 1992 [DE] Germany .................. 42 20 551.4

[51] Int. Cl.[6] .................. C09B 45/06; C09B 45/14; C23C 22/26; D06P 1/10
[52] U.S. Cl. .................. 534/696; 8/522; 8/437; 8/527; 8/681; 8/688; 534/721; 534/723; 534/725
[58] Field of Search .................. 534/696, 721, 723; 8/522, 527, 437, 681, 585

[56] References Cited

U.S. PATENT DOCUMENTS

| 1,865,978 | 7/1932 | Straub et al. | 534/725 |
|---|---|---|---|
| 1,888,516 | 11/1932 | Straub et al. | 534/725 |
| 1,925,434 | 9/1933 | Clingestein et al. | 534/721 |
| 2,074,225 | 3/1937 | Krebser | 534/721 |
| 2,128,325 | 8/1938 | Rose | 534/721 |
| 2,276,174 | 3/1942 | Fleischhauer et al. | 534/721 |
| 4,663,441 | 5/1987 | Grychtol | 534/596 |
| 4,710,198 | 12/1987 | Beffa, et al. | 8/437 |
| 4,977,249 | 12/1990 | Matsumoto et al. | 534/696 |
| 5,123,930 | 6/1992 | Bitterli | 8/522 |
| 5,283,325 | 2/1994 | Bitterli, II | 534/721 |

FOREIGN PATENT DOCUMENTS

| 0752016 | 11/1970 | Belgium | 534/696 |
|---|---|---|---|
| 0231147 | 8/1987 | European Pat. Off. | 534/696 |
| 1272728 | 8/1961 | France | 534/721 |
| 1486227 | 6/1967 | France | 534/696 |
| 55-60562 | 5/1980 | Japan | 534/696 |
| 55-97492 | 7/1980 | Japan | 534/696 |
| 57-73052 | 5/1982 | Japan | 534/696 |
| 63-267793 | 11/1988 | Japan | 534/696 |
| 2170213 | 7/1986 | United Kingdom | 534/696 |
| 2187470 | 9/1987 | United Kingdom | 534/696 |

Primary Examiner—Floyd D. Higel
Attorney, Agent, or Firm—Robert S. Honor; Melvyn M. Kassenoff

[57] ABSTRACT

Complexes of the formula

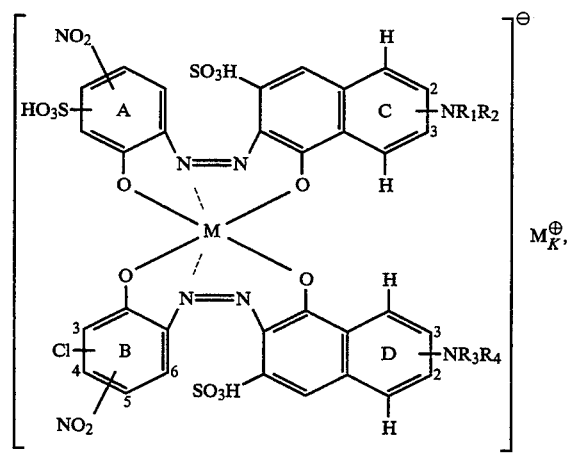

which are in free acid or salt form, and mixtures thereof, wherein each of $R_1$ and $R_3$ is independently hydrogen, $C_{1-4}$ alkyl or $C_{1-4}$ alkyl monosubstituted by hydroxy, amino, sulfo or carboxy, each of $R_2$ and $R_4$ is independently hydrogen; $C_{1-4}$ alkyl; $C_{1-4}$ alkyl monosubstituted by hydroxy, amino, sulfo or carboxy; $-COR_5$; $-COOR_6$ or $-CONHR_7$, M is chromium or cobalt, and $M_K^\oplus$ is hydrogen or a non-chromophoric cation, useful for dyeing or printing, materials such as natural and synthetic polyamides and particularly artificially produced oxide layers on aluminum and aluminum alloys.

20 Claims, No Drawings

ASYMMETRICAL 1:2 CHROMIUM AND COBALT COMPLEXES OF FURTHER SUBSTITUTED 6- OR 7-AMINO-1-HYDROXY-2-(NITRO-PHENYLAZO)-3-SULFONAPTHALENES

The invention relates to asymmetrical 1:2 metal complex azo compounds of chromium or cobalt containing sulphonic acid groups, their production and their use as anionic dyestuffs.

More particularly, the invention provides asymmetrical 1:2 metal complexes of formula I

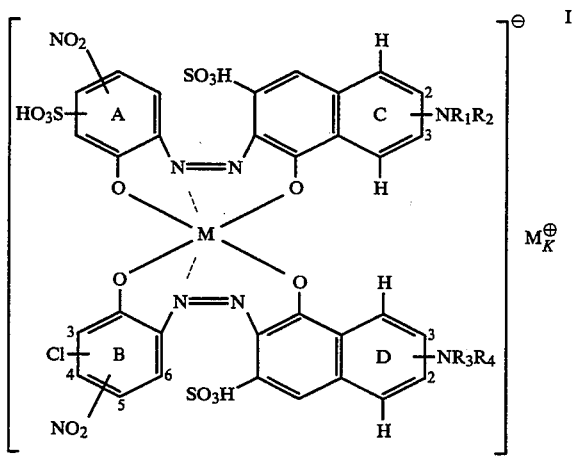

which are in free acid or salt form, in which

M is chromium or cobalt and $M_K^\oplus$ is hydrogen or a non-chromophoric cation, each of $R_1$ and $R_3$ is independently hydrogen, $C_{1-4}$alkyl or $C_{1-4}$alkyl monosubstituted by hydroxy, amino, sulpho or carboxy, each of $R_2$ and $R_4$ is independently hydrogen, $C_{1-4}$alkyl, $C_{1-4}$alkyl monosubstituted by hydroxy, amino, sulpho or carboxy; —$COR_5$; —$COOR_6$ or —$CONHR_7$, $R_5$ is $C_{1-6}$alkyl; $C_{1-6}$alkyl monosubstituted by hydroxy, halogen, $C_{1-4}$alkoxy, sulpho or carboxy; phenyl; phenyl substituted by one or two groups selected from halogen, $C_{1-4}$alkyl, $C_{1-4}$alkoxy, sulpho and carboxy; phenyl($C_{1-4}$alkyl) or phenyl($C_{1-4}$alkyl) in which the phenyl group is substituted by one or two groups selected from halogen, $C_{1-4}$alkyl, $C_{1-4}$alkoxy, sulpho and carboxy, $R_6$ is $C_{1-4}$alkyl; $C_{1-4}$alkyl monosubstituted by hydroxy, halogen, $C_{1-4}$alkoxy, sulpho or carboxy; phenyl; phenyl substituted by one or two groups selected from halogen, $C_{1-4}$alkyl, $C_{1-4}$alkoxy, sulpho and carboxy; phenyl($C_{1-4}$alkyl); phenyl($C_{1-4}$alkyl) in which the phenyl group is substituted by one or two groups selected from halogen, $C_{1-4}$alkyl, $C_{1-4}$alkoxy, sulpho and carboxy; or cyclohexyl, and $R_7$ is hydrogen; $C_{1-4}$alkyl; $C_{1-4}$alkyl monosubstituted by hydroxy, amino, sulpho or carboxy; phenyl; phenyl substituted by one or two groups selected from halogen, $C_{1-4}$alkyl, $C_{1-4}$alkoxy, sulpho and carboxy; or cyclohexyl, and mixtures of complexes of formula I and salts thereof.

In the specification any alkyl, the alkyl moiety of any phenyl-substituted alkyl group or the alkyl group of any alkoxy group is linear or branched unless otherwise stated.

Any halogen is preferably fluorine, chlorine or bromine; more preferably it is chlorine or bromine, especially chlorine.

In any hydroxy- or amino-substituted alkyl group defined as $R_1$ to $R_4$ and $R_7$, the substituent is preferably bound to a carbon atom which is not directly bound to the nitrogen atom.

M is most preferably chromium.

Any substituted alkyl group as $R_1$ to $R_4$ and $R_7$ is preferably monosubstituted by hydroxy, amino or sulpho, more preferably by hydroxy or amino.

Any substituted alkyl group as $R_5$ or $R_6$ is preferably monosubstituted by hydroxy, chlorine, methoxy, sulpho or carboxy.

Any substituted phenyl group or phenyl($C_{1-4}$alkyl) substituted in the phenyl ring preferably bears one or two groups selected from chlorine, methyl, methoxy, sulpho and carboxy.

Preferably, one of the floating groups on ring A is in ortho-position and the other in para-position related to —O—, i.e., the nitro and sulpho groups are preferably in meta-position to each other.

In ring B, the positions of chlorine and nitro are preferably as follows:
3-chloro/5-nitro, 5-chloro/3-nitro and 5-chloro/4-nitro; most preferred is 3-chloro/5-nitro.

$R_5$ is preferably $R_{5a}$, where $R_{5a}$ is $C_{1-5}$alkyl, phenyl or benzyl; more preferably it is $R_{5b}$, where $R_{5b}$ is $C_{1-3}$alkyl.

$R_6$ is preferably $R_{6a}$, where $R_{6a}$ is methyl, ethyl, phenyl or benzyl; more preferably it is $R_{6b}$, where $R_{6b}$ is methyl or ethyl.

$R_7$ is preferably $R_{7a}$, where $R_{7a}$ is hydrogen, methyl, ethyl, phenyl or cyclohexyl. Particularly, $R_7$ is hydrogen.

$R_1$ and $R_3$ are preferably $R_{1a}$ and $R_{3a}$, where each of $R_{1a}$ and $R_{3a}$ is independently hydrogen, methyl, 2-hydroxyethyl or 2-aminoethyl.

$R_2$ and $R_4$ are preferably $R_{2a}$ and $R_{4a}$, where each of $R_{2a}$ and $R_{4a}$ is independently hydrogen, methyl, —$COR_{5a}$, —$COOR_{6b}$ or —$CONHR_{7a}$; more preferably $R_2$ and $R_4$ are $R_{2b}$ and $R_{4b}$, where each of $R_{2b}$ and $R_{4b}$ is independently hydrogen, —$COR_{5b}$ or —$CONH_2$.

Most preferably, each of $R_1$ to $R_4$ is hydrogen, where each amino group is preferably bound in the 3-position of each of rings C and D, or the amino group of ring C is in the 2-position and the amino group of ring D is in the 3-position and vice versa.

Preferred asymmetrical 1:2 chromium complexes correspond to formula Ia

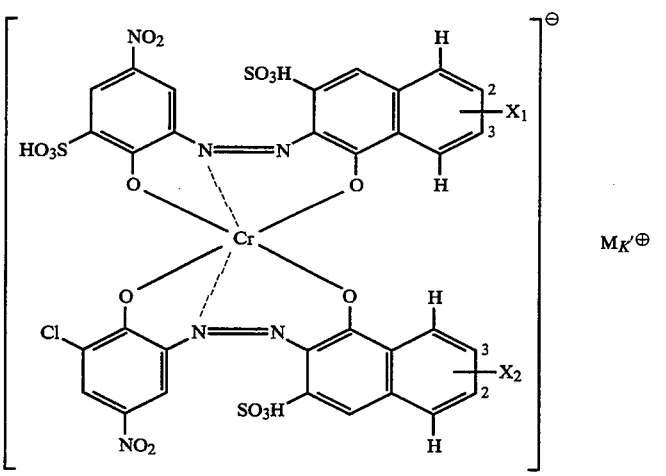

Ia $M_{K'}^{\oplus}$ and their salts and mixtures thereof, in which
one of $X_1$ and $X_2$ is —$NH_2$ and the other is —$NH_2$,
—$NHCH_3$, —$N(CH_3)_2$, —$NHCH_2CH_2OH$,
—$NHCH_2CH_2NH_2$, —$NHCOR_{5a}$, —$NHCOOR_{6b}$ or
—$NHCONHR_{7a}$, in which
$R_{5a}$, $R_{6b}$ and $R_{7a}$ are as defined above, and
$M_{K'}^{\oplus}$ is a non-chromophoric cation.

More preferably, one of $X_1$ and $X_2$ is —$NH_2$ and the other is —$NH_2$, —$NHCOR_{5b}$ or —$NHCONH_2$, in which $R_{5b}$ is as defined above. It is especially preferred that $X_1$ and $X_2$ are both —$NH_2$.

The positions of floating $X_1$ and $X_2$ are preferably as follows:

$X_1$ and $X_2$ are preferably both in position 3, or one of $X_1$ and $X_2$ is in position 2 and the other is in position 3.

The invention further provides a process for the production of the asymmetrical 1:2 metal complexes of formula I comprising adding to a 1:1 chromium or 1:1 cobalt complex of a monoazo compound of formula II

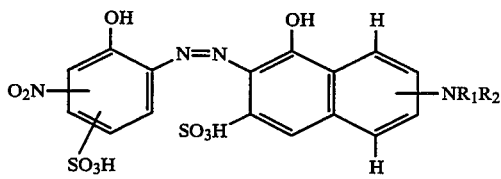

in which $R_1$ and $R_2$ are as defined above, or a salt thereof, a metal-free monoazo compound of formula III

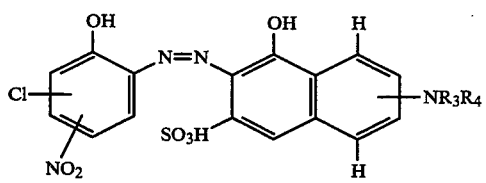

in which $R_3$ and $R_4$ are as defined above, or a salt thereof.

Asymmetrical 1:2 chromium complexes of formula I can also be prepared in a one step reaction by reacting a metal-free compound of formula II and a metal-free compound of formula III which are as defined as above, or a salt thereof with the appropriate amount of a chromium(III) salt. The chromium-donating compound is employed in such an amount that at least one mole of the chromium(III) salt is used to react with two moles of the metal-free compounds of formulae II and III. This one step reaction is effected by maintaining certain reaction conditions in such a way that first the 1:1 chromium complex is formed to which, without any isolation, further available metal-free azo compound is added.

Suitable metal-donating compounds are the conventionally used chromium(III) or cobalt(III) salts. Metallisation (to produce 1:1 or 1:2 metal complexes) is carried out in accordance with known methods.

For example, the conversion of the metal-free azo compound into the 1:1 chromium complex is advantageously carried out at an acid pH (a pH of ca. 1.5 to 3) and at a temperature within the range of 80° to 140° C. or at the boiling point of the reaction mixture, either under atmospheric or superatmospheric pressure. The addition of the metal-free azo compound to the 1:1 chromium complex is suitably effected in a weakly acid, neutral or weakly alkaline medium (preferably at a pH of 6-8) and at the boiling point of the reaction mixture.

The reaction medium to be used is preferably water; optionally an organic solvent miscible with water such as formamide, glycerin or ethylene glycol can be added.

Isolation of the 1:2 metal complexes of formula I is carried out in conventional manner, preferably by salting out and filtration. Solutions of the metal complex in organic solvents are diluted with water. From the aqueous solution the metal complex is precipitated by cooling, possibly with the addition of salts. Subsequently, the product is separated by filtration, followed by drying and grinding to a powder, if desired.

Depending on the reaction and isolation conditions the 1:2 metal complexes according to the invention are obtained in free acid form or preferably in salt form with respect to the cation neutralising the chromophoric complex anion and also the cation neutralising the sulphonic acid groups and any further anionic groups present. The cation neutralising the complex anion is not critical and may be any of those non-chromophoric cations common in the field of anionic metal complex dyestuffs. Examples of suitable cations are alkali metal cations and unsubstituted or substituted ammonium ions, such as lithium, sodium, potassium, ammonium, mono-, di-, tri- and tetra-methylammonium, triethylammonium, mono-, di- and tri-ethanolammonium and mono-, di- and tri-isopropanolammonium. The preferred cations are the alkali metal cations and ammonium, with potassium or sodium being the most preferred.

Likewise, the sulphonic acid groups and any other anionic groups are preferably in salt form. Suitable cations are those mentioned as cations neutralising the complex anion. Generally, all cations present in a 1:2 metal complex of formula I may be the same or different; preferably, they are identical, with potassium or sodium being the most preferred cation.

The monoazo compounds of formulae II and III used as starting materials are known or may be prepared in accordance with known methods from available starting materials.

The asymmetrical 1:2 metal complexes of formula I are readily soluble in water and are suitable for dyeing or printing various materials, such as natural and synthetic polyamides, for example wool, silk or nylon, polyurethanes and also leather. They are particularly suited for dyeing or printing artificially produced oxide layers on the surface of metallic aluminum or aluminium alloys, i.e., layers produced by chemical or preferably anodising processes, preferably in aqueous solutions. The complexes of formula I may also be used in the form of storage-stable liquid concentrated dye preparations which may be prepared by dissolving the dyestuff preferably in water optionally with the addition of an organic solvent miscible with water and optionally in the presence of conventional auxiliaries, such as solubilising agents.

The oxide layers on aluminum dyed with the complexes of formula I show high resistance to heat and good light fastness and do not show any bleeding.

Furthermore, the complexes of formula I give highly stable dyebaths and have a high absorption rate. During the dyeing process, they are not or only slightly sensitive to aluminum ions.

By oxide layers produced by anodising processes is meant porous layers of aluminium oxide adhering firmly to the base metal, such as those produced by electrochemical treatment of the aluminum surface in an electrolyte-containing water and a suitable acid, using direct current with the aluminum workpiece forming the anode.

In the field of surface treatments for aluminum, coloured oxide layers produced by anodisation are very important owing to their exceptional resistance to mechanical damage and corrosion. In order to produce coloured oxide layers conventional processes may be used. Advantageously, dyeing is effected in accordance with the adsorptive dyeing process, a method by which the anodised aluminum is immersed in an aqueous dyestuff solution. The treatment may be carried out at normal temperatures, i.e., in the range between room temperature and the boiling point of the bath. Temperatures between 55° and 65° C. are particularly favourable. The pH is so chosen that the oxide layer is either not attacked or only slightly affected, i.e., dyeing is suitably carried out in the pH range of 3 to 8, preferably in the pH range of 4.5 to 6. Adjustment and maintenance of the pH may be achieved by the addition of usual acids and bases, such as sulphuric acid, acetic acid and sodium hydroxide solution. If required, other additives generally used to improve the coloration process, such as equalising additives, buffer systems and organic solvents miscible with water may be used.

The dyestuff concentration and time of treatment may be varied over a wide range, according, among other factors, to the required intensity of dye shade, the thickness and structure of the oxide layer, as well as the other dyeing conditions. The preferred concentration range is from 0.01 to 10 grams per liter. The preferred duration of treatment is from 1 to 30 minutes, a treatment time of 15 to 20 minutes being particularly suitable.

By aluminum is meant not only pure aluminium, but also those aluminium alloys which behave similarly as the pure metal with regard to anodic oxidation, such as alloys of the type Al/Mg, Al/Si, Al/Mg/Si, Al/Zn/Mg, Al/Cu/Mg and Al/Zn/Mg/Cu. As electrolytes for the anodising process, chromic, oxalic and sulphuric acid can be used, among others, as well as mixtures of oxalic and sulphuric acid. The direct current sulphuric acid process is the most preferred anodising method.

The process may also be carried out in such a manner that dyeing occurs at the same time as the anodic production of the oxide layer.

The 1:2 metal complexes of formula I are also suitable for the coloration of chemically produced oxide layers on aluminum, the so-called conversion layers as produced, for example, by the effect of acid or alkaline baths containing the salts of chromic acid.

After dyeing, the coloured oxide layer is processed in the usual manner. A particularly advantageous method of aftertreatment is the sealing of the oxide layer by treating with boiling water or steam, optionally in the presence of an agent which promotes sealing and at the same time inhibits bleeding of the dyestuff, such as nickel or cobalt acetate.

The following examples further serve to illustrate the invention. In the examples all parts and percentages are by weight and the temperatures are given in degrees centigrade unless otherwise stated.

EXAMPLE 1 a) Preparation of the 1:1 Chromium Complex (1a)

24.2 Parts (0.05 mole, calculated on 100% active dye) of the azo dyestuff obtained from the alkaline coupling reaction of diazotised 2-amino-4-nitrophenol-6-sulphonic acid with 2-amino-8-hydroxynaphthalene-6-sulphonic acid according to a conventional method, are suspended in 300 parts of water. The pH is adjusted to 2.2 by adding hydrochloric acid solution, and then 2 parts of salicylic acid and 0.05 mole chromium in the form of chromium(III) sulphate are added. The reaction mixture is heated to the boil and is further boiled for 24 hours, while maintaining the pH at 2.2. After this time the reaction is completed with no further starting material in form of the metal-free azo compound being detectable. Isolation of the chromium complex 1a is effected by filtering and washing with water and subsequent drying.

b) Preparation of the Asymmetrical 1:2 Chromium Complex (1b)

26.7 Parts (0.05 mole, calculated on 100% active) of the 1:1 chromium complex 1a are suspended in 600 parts of water. To this suspension 21.9 parts (0.05 mole, calculated on 100% active) of the azo dyestuff are added which has been prepared in accordance with a conventional method by reacting diazotised 2-amino-6-chloro-4-nitrophenol with 2-amino-5-hydroxynaphthalene-7-sulphonic acid. The pH of the reaction mixture is adjusted to 6–7 by the addition of sodium hydroxide solution, and the solution is heated to 100°. After three hours at the boil, there are no starting compounds still detectable. The resultant 1:2 chromium complex 1b is salted out with potassium chloride and then filtered and dried. It has the formula

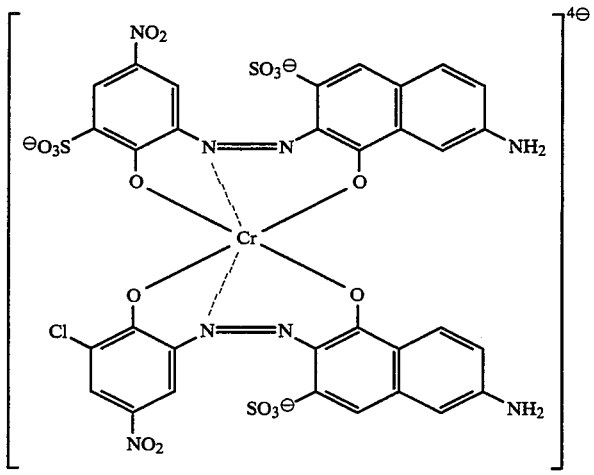

(1b)

4K⊕ and dyes anodically oxidised aluminum in black shades. These dyeings exhibit good resistance to heat and show good fastness to light and are also fast to bleeding.

EXAMPLE 2

The asymmetrical 1:2 chromium complex 1b of Example 1 can also be prepared in a one step reaction as follows:

12.1 Parts (0.025 mole, calculated on 100% active) of the metal-free dyestuff obtained from the reaction of diazotised 2-amino-4-nitrophenol-6-sulphonic acid with 2-amino-8-hydroxynaphthalene-6-sulphonic acid according to a known method and 11 parts (0.025 mole, calculated on 100% active) of the metal-free dyestuff obtained from the reaction of diazotised 2-amino-6-chloro-4-nitrophenol with 2-amino-5-hydroxynaphthalene-7-sulphonic acid in accordance with a known method are suspended in 200 parts of water. The pH of the mixture is adjusted to 2.2 with the addition of hydrochloric acid. Subsequently, 6.2 parts (0.025 mole) of chromium(III) acetate are added, and the suspension is stirred for 24 hours to boiling temperature. After the pH has been adjusted at 6.5 by the addition of sodium hydroxide solution, the reaction mixture is heated at the boil for a further three hours. After this time, starting compounds are no longer detectable. The resultant chromium complex is precipitated by adding potassium chloride and is filtered and dried. The dyeing properties of the complex thus obtained are the same as those of the complex prepared in accordance with the method described in Example 1.

EXAMPLES 3 to 21

By analogy with the method described in Example 1 or 2 using appropriate starting compounds, further asymmetrical 1:2 chromium complexes can be prepared which are listed in the following Table. They correspond to formula (A)

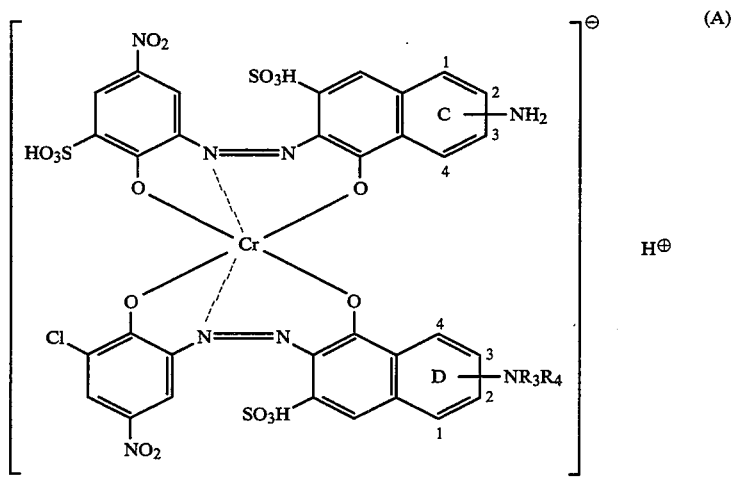

(shown in free acid form) in which the symbols are as defined in the Table.

The complexes of Examples 3 to 21 dye anodically oxidised aluminum in black shades. The dyeings obtained show good properties with respect to bleeding, fastness to light and resistance to heat.

TABLE

| | Complexes of formula (A) | | |
|---|---|---|---|
| Ex. No. | position of —NH$_2$ in ring C | —NR3R4 | position of —NR$_3$R$_4$ in ring D |
| 3 | 3 | —NH$_2$ | 3 |
| 4 | 3 | —NHCOCH$_3$ | 3 |
| 5 | 3 | —NHCOCH$_2$CH$_3$ | 3 |
| 6 | 3 | —NHCO(CH$_2$)$_2$CH$_3$ | 3 |
| 7 | 3 | —NHCOCH(CH$_3$)$_2$ | 3 |
| 8 | 3 | —NHCO(CH$_2$)$_4$CH$_3$ | 3 |
| 9 | 3 | —NHCH$_2$CH$_2$NH$_2$ | 3 |
| 10 | 3 | —NHCH$_2$CH$_2$OH | 3 |
| 11 | 3 | —N(CH$_3$)$_2$ | 3 |
| 12 | 3 | —NHCOCH$_3$ | 2 |
| 13 | 3 | —NHCOCH(CH$_3$)$_2$ | 2 |
| 14 | 3 | —NHCO(CH$_2$)$_4$CH$_3$ | 2 |
| 15 | 2 | —NH$_2$ | 3 |
| 16 | 2 | —NHCOCH$_3$ | 3 |
| 17 | 2 | —NH$_2$ | 2 |
| 18 | 2 | —N(CH$_3$)$_2$ | 3 |
| 19 | 2 | —NHCOCH$_2$CH$_3$ | 3 |
| 20 | 3 | —NHCONH$_2$ | 2 |
| 21 | 3 | —NHCOOCH$_2$CH$_3$ | 2 |

In accordance with the reaction and isolation conditions described in Examples 1 and 2, the 1:2 chromium complexes of Examples 3 to 21 like the complex of Example 1 (2) are obtained in potassium salt form. They may be converted into other salt forms or even mixed salt forms containing one or more of the cations indicated in the description above in accordance with known methods.

EXAMPLE 22

35 Parts of the dried dyestuff of Example 1 are stirred into 65 parts of water at 60°. 100 Parts of a stable liquid homogeneous dye preparation are obtained. Such preparation does not show any precipitation of dyestuff after prolonged storage at temperatures below 0° and gives a clear solution within a very short time when added to water.

In the following examples the application of the 1:2 chromium complexes as described is illustrated.

APPLICATION EXAMPLE A

A degreased and deoxidised workpiece of pure aluminum is anodically oxidised for 30 minutes at a temperature of 18° to 20° with a potential of 15 to 16 volts and with a direct current of 1.5 amperes/dm$^2$ density in an aqueous solution containing 18 to 22 parts of sulphuric acid and 1.2 to 7.5 parts of aluminum sulphate per 100 parts. An oxide layer of approximately 12μ thickness is obtained.

After rinsing with water, the workpiece is immersed for a period of 15 minutes at 60° in a solution containing 5 parts of the chromium complex produced in accordance with Example 1 in 1000 parts of deionised water the pH of which is adjusted to ca. 5.5 by means of acetic acid and sodium acetate. The dyed workpiece is rinsed with water and then sealed in deionised water for 30 minutes at 98° to 100°. A pure black coloration is obtained having good resistance to heat and also to fading on exposure to light.

If the sealing is carried out under otherwise identical conditions in a solution containing 3 parts of nickel acetate in 1000 parts of water, a coloration of comparable quality is obtained.

APPLICATION EXAMPLE B

10 Parts of the dyestuff produced according to Example 1 are dissolved in 500 parts of water and stirred into a highly viscous solution consisting of 400 parts of water and 100 parts of Methyl Cellosolve ® of a medium degree of polymerisation and 1.5 degree substitution. The printing ink thus obtained is applied by a screen printing process to a dry oxidised aluminium sheet obtained by anodising an aluminum alloy of the type Al/Mg/Si (0.5) for 30 minutes in a solution of 100 parts of chromic anhydride in 1000 parts of water at 53° and a current density of 1.2 amperes/dm$^2$. The printed aluminum alloy sheet is immersed in boiling water for 10 minutes and then rinsed thoroughly with cold water. A black pattern on a pale greyish undercoat is obtained.

Similarly, the dye complexes of Examples 3 to 21 may be employed in accordance with Application Example A or B; for the process of Application Example A it is also possible to use a liquid dye preparation of the dyestuffs of Examples 1 to 21 (according to Example 22).

What is claimed is:

1. A complex of the formula

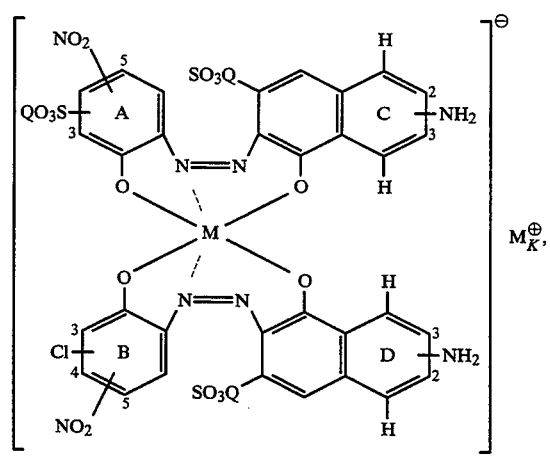

or a mixture of such complexes,
wherein
M is chromium or cobalt,
M$_K^\oplus$ is hydrogen or a non-chromophoric cation, and
each
Q is independently hydrogen or a non-chromophoric cation.

2. A complex according to claim 1.
3. A complex according to claim 2
wherein each
non-chromophoric cation is independently lithium, sodium, potassium, ammonium, methylammonium, dimethylammonium, trimethylammonium, tetramethylammonium, triethylammonium, ethanolammonium, diethanolammonium, triethanolammonium, isopropanolammonium, diisopropanolammonium or triisopropanolammonium.

4. A complex according to claim 3
wherein each
non-chromophoric cation is independently lithium, sodium, potassium or ammonium.

5. A complex according to claim 4
wherein each
non-chromophoric cation is independently sodium or potassium.

6. A complex according to claim 3 wherein
M$_K$⊕ and each Q is independently lithium, sodium potassium, ammonium, methylammonium, dimethylammonium, trimethylammonium, tetramethylammonium, triethylammonium, ethanolammonium, diethanolammonium, triethanolammonium, isopropanolammonium, diisopropanolammonium or triisopropanolammonium.

7. A complex according to claim 6 wherein
M$_K$⊕ and each Q are identical.

8. A complex according to claim 7 wherein
M$_K$⊕ and each Q are sodium or
M$_K$⊕ and each Q are potassium.

9. A complex according to claim 2 wherein
M is chromium.

10. A complex according to claim 2 wherein
the nitro group or the sulfo group on Ring A is in the 3-position and the other of these two groups is in the 5-position, and
the chloro substituent on Ring B is in the 3-position and the nitro group on this ring is in the 5-position, or the chloro substituent on Ring B is in the 5-position and the nitro group on this ring is in the 3- or 4-position.

11. A complex according to claim 2 wherein
the —NH$_2$ group on Ring C is in the 2- or 3-position and the —NH$_2$ group on Ring D is in the 3-position, or
the —NH$_2$ group on Ring C is in the 3-position and the —NH$_2$ group on Ring D is in the 2-position.

12. A complex according to claim 1 having the formula

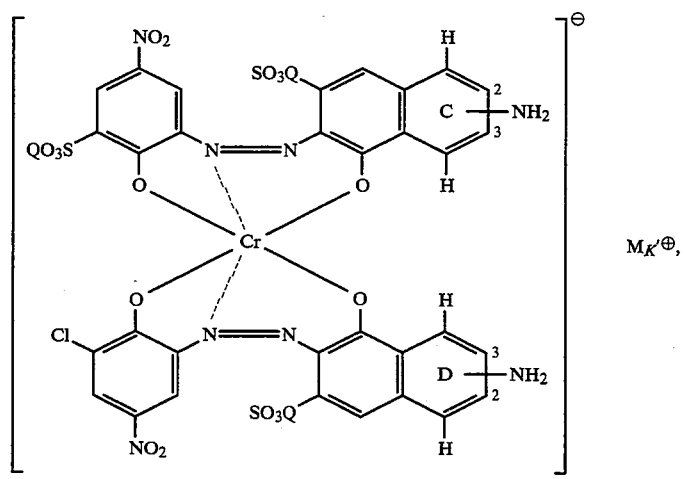

or a mixture of such complexes,
wherein
M$_{K'}$⊕ is a non-chromophoric cation, and each
Q is independently hydrogen or a non-chromophoric cation.

13. A complex according to claim 12 wherein
each Q is independently a non-chromophoric cation.

14. A complex according to claim 12 wherein
the —NH$_2$ group on Ring C is in the 2-position and the —NH$_2$ group on Ring D is in the 3-position, or
the —NH$_2$ group on Ring C is in the 3-position and the —NH$_2$ group on Ring D is in the 2- or 3-position.

15. A complex according to claim 14 wherein each
Q is independently a non-chromophoric cation, and the —NH$_2$ group on Ring C is in the 3-position and the —NH$_2$ group on Ring D is in the 2-position.

16. A complex according to claim 15 wherein
M$_K$⊕ and each Q are sodium, or
M$_K$⊕ and each Q are potassium.

17. The complex according to claim 15 having the formula

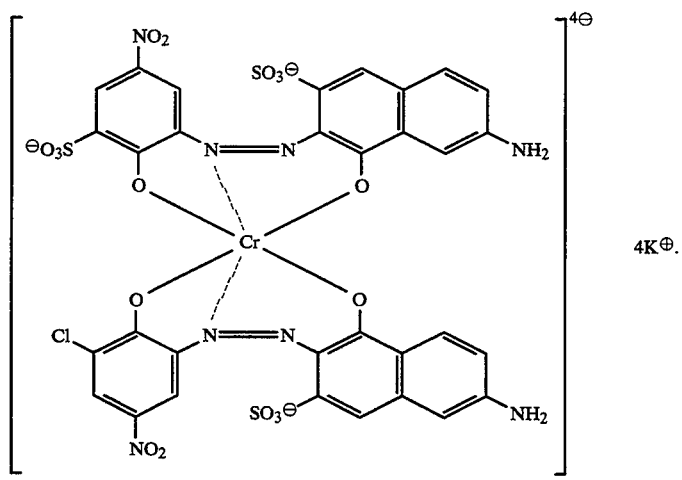

4K⊕.

18. A process for dyeing or printing a substrate comprising applying to a substrate, as a dyeing or printing agent, a complex according to claim 2.

19. A process according to claim 18 wherein the substrate is an aluminum or aluminum alloy substrate having on its surface an artificially produced oxide layer.

20. A process according to claim 19 wherein the substrate is an anodized aluminum or aluminum alloy substrate.

* * * * *